United States Patent [19]

Walsh

[11] Patent Number: 5,096,212
[45] Date of Patent: Mar. 17, 1992

[54] CHUCK FOR POWER TOOLS

[76] Inventor: Joseph P. Walsh, 8638 Cromwell Rd., Springfield, Va. 22151

[21] Appl. No.: 617,623

[22] Filed: Nov. 26, 1990

Related U.S. Application Data

[63] Continuation-in-part of Ser. No. 394,056, Aug. 14, 1989, Pat. No. 4,972,748.

[51] Int. Cl.⁵ .............................................. B23B 31/20
[52] U.S. Cl. .................... 279/41 R; 279/44; 279/46 R; 279/66; 279/83
[58] Field of Search ............... 279/1 A, 1 TE, 1 ME, 279/41 R, 44, 46 R, 76, 86, 97, 45, 66, 67, 73, 83, 96; 403/344, 373

[56] References Cited

U.S. PATENT DOCUMENTS

| | | |
|---|---|---|
| 77,219 | 4/1868 | Rundlett . |
| 273,409 | 3/1883 | Voos .............................. 279/67 X |
| 374,743 | 12/1887 | Jones . |
| 505,252 | 9/1893 | Phillips . |
| 668,395 | 2/1901 | Stirckler . |
| 781,761 | 2/1905 | Binnie . |
| 854,512 | 5/1907 | Mapes . |
| 922,429 | 5/1909 | Hollm .............................. 279/97 X |
| 965,893 | 8/1910 | Hanson ............................ 279/95 X |
| 1,140,978 | 5/1915 | Hart . |
| 1,765,362 | 6/1930 | Berry . |
| 1,828,862 | 10/1931 | Hansen . |
| 2,360,908 | 10/1944 | Stoner ............................. 279/51 |
| 2,500,491 | 3/1950 | Hampton . |
| 2,535,951 | 12/1950 | Parigian . |
| 2,676,809 | 4/1954 | Smith ............................. 279/83 X |
| 2,689,740 | 9/1954 | Parigian . |
| 2,695,787 | 11/1954 | Sunnen . |
| 2,710,193 | 6/1955 | Baron . |
| 2,793,041 | 5/1957 | Barbier et al. ............... 279/41 R X |
| 2,817,532 | 12/1957 | Hohwart et al. . |
| 2,896,956 | 7/1959 | Ann . |
| 2,935,329 | 5/1960 | Hessler . |
| 2,938,698 | 5/1960 | Johnson .......................... 279/83 X |
| 2,996,301 | 8/1961 | Cox . |
| 3,091,474 | 5/1963 | Boutros et al. . |
| 3,171,665 | 3/1965 | Brauer ............................ 279/67 |
| 3,204,266 | 9/1965 | Carter, Jr. et al. . |
| 3,411,796 | 11/1968 | Decker . |
| 3,791,661 | 2/1974 | Giles . |
| 3,820,801 | 6/1974 | Lindler . |
| 3,837,661 | 9/1974 | Phillippi . |
| 4,575,293 | 3/1986 | Berti . |
| 4,804,197 | 2/1989 | Drbal . |
| 4,869,136 | 9/1989 | Easter et al. . |
| 4,896,892 | 1/1990 | Andrews . |

FOREIGN PATENT DOCUMENTS 14832  4/1914  United Kingdom ................ 403/344

OTHER PUBLICATIONS

1990 Amana Tool Corp. Catalog (Front and Back Pages and p. 36), 1990.

Primary Examiner—Steven C. Bishop
Attorney, Agent, or Firm—Stevens, Davis, Miller & Mosher

[57] ABSTRACT

Improved chucks are provided for securing a cutting element to a power driving unit. The improved chucks are easy to manufacture and do not require mechanical aptitude or great manual dexterity in order to securely connect the cutting element to the power driving unit. These chucks may be used in combination with various power drive units such as power drills, drill presses, routers, lathes and milling machines, rotary sanders and grinders and other rotating cutting elements.

28 Claims, 6 Drawing Sheets

CHUCK FOR POWER TOOLS

REFERENCE TO RELATED APPLICATIONS

This application a continuation-in-part of my earlier application Ser. No. 394,056, filed Aug. 14, 1989, now U.S. Pat. No. 4,972,748, the entire disclosure of which is herein incorporated by reference.

FIELD OF THE INVENTION

In my previous application, I disclosed a novel portable table for guiding power tools in relation to the work. Among such power tools were disclosed power drills and routers.

As is well known in the art, power drills and routers comprise a power drive unit, such as an electric, hydraulic or pneumatic motor, as well as a respective cutting tool, such as a drill bit or router bit. Between the power drive unit and cutting tool is a coupling element, or chuck, to secure the cutting tool to the power drive unit.

The improved chucks of the present invention have particular utility for use with the power tools used in conjunction with the portable table of my previous application because it is easy to secure the cutting element to the drive motor in a simple and reliable manner. Because the novel chucks of the present invention are also easier to manufacture and use than prior art chucks, these attributes make them particularly useful as chucks for securing cutting elements to various motor driving units separate and apart from those associated with my portable table. Thus, the chucks of the present invention may be utilized together with any power driving units and cutting elements other than power drills and routers including, but not limited to, rotary sanders and grinders, lathes, milling machines and other rotating cutting elements.

DESCRIPTION OF THE PRIOR ART

The chucks known in the prior art may be made adjustable in order to secure various shank size cutting elements, such as the conventional gear and key chucks well known for holding drill bits of different shank sizes. Other chucks in the prior art may be used for holding fixed shank size or specialized shank cutting elements. However, in many cases, the chucks of the prior art do not adequately secure the cutting element to the power drive unit. When the chucks are designed to accept shanks of different sizes, the chucks of the prior art become extremely complicated to manufacture. Additionally, even when chucks of the prior art are designed for fixed shank sized cutting elements, the manufacture and use of such chucks are unduly complicated adding to the cost of manufacture and requiring increased mechanical skill and manual dexterity in order to properly secure the cutting element to the power drive unit.

Examples of specific chucks which are known to the prior art for holding a tool shank include that disclosed in U.S. Pat. No. 1,765,362. This patent discloses a drill holder for a drill press which includes a tubular member and internally threaded sleeve. The tubular member has slots which run in the longitudinal direction in order to form a plurality of jaws. By threading the sleeve on the tubular member, the tubular member can compress the jaws thereby holding the drill. The degree of compression necessary to firmly grip the drill is not readily obtainable by means of manually threading the sleeve onto the tubular member.

U.S. Pat. No. 1,828,862 discloses a chuck for receiving flat broaching steels. This chuck has a flattened receiver having a recessed end to form a flange. The flange is designed to overlap the flat of the broaching steel and a bore is cut transversely through the receiver. A conforming bore is cut through a locking key so as to register with the bore cut through the receiver. A bolt is positioned so as to go through both bores and a nut on the outside of the receiver clamps the locking key to the receiver to hold the broaching steel in place. The construction of this chuck is cumbersome and difficult to machine and is not suitable for use with round shanks.

Another type of device is illustrated in U.S. Pat. No. 2,535,951. This patent discloses arcuate spring jaws, each having an actuator to tighten down upon a collet. Each of the three arcuate spring jaws is provided with a pad which is threadedly attached by a screw. The screw may be manipulated by means of a rod to securely clamp the pad to its respective jaw. This device is not only expensive to manufacture but requires the use of a conventional collet ring to actuate the jaws.

Further improvements in chucks for holding a tool shank are shown in the centrifugal chuck assembly described in U.S. Pat. No. 3,837,661. This disclosure provides an insert for a bore and a chuck body which insert is resilient and provided with an enlargement on one end causing it to be resiliently compressed as it is inserted into the bore in the chuck body. When used in a centrifugal chuck assembly, the insert extends between opposed gripping surfaces of the centrifugal gripping holding members so as to retain the insert within the chuck body. This device is not only costly to manufacture but requires a precision mounted and cumbersome construction making it unsuitable for widespread use.

U.S. Pat. No. 4,575,293 discloses a machine tool holder for holding a cutting tool. The cutting tool is provided with a bore through which is inserted a threaded member. The threaded member can tighten abutments which are drawn into abutting relation with the shank to clamp the shank to the machine tool holder. This arrangement requires that the shanks of the cutting tools be specifically machined so as to mate the abutment and clamp means and requires that a bore be provided in each cutting tool. Such specialized tool shanks limit the utility of this chuck.

U.S. Pat. No. 4,896,892 discloses the use of an improved bushing for mounting shanked tools such as drills, boring bars and the like, within the socket bore of standard machine turrets or tool holders. As disclosed by patentees, a pair of set or clamp screws are threadedly engaged through threaded holes formed in the wall defining the socket so as to compress the collet and secure the tool shank. This construction is not advantageous because the set screws are aligned so as to pass through the center of the tool shank and bushing thereby requiring great mechanical effort in order to securely hold the shank of the cutting tool. Additionally, this arrangement can cause the tool to become off-centered during tightening of the set screws.

The disclosures of each of the foregoing documents are herein expressly incorporated by reference.

None of the foregoing chucks of the prior art provides a chuck which is easy to manufacture and capable of securely retaining the shank of a cutting tool without exertion of undue force, and which may be utilized by those having no mechanical aptitude and little manual dexterity.

OBJECTS OF THE INVENTION

It is an object of the present invention to provide an improved chuck which is easy to manufacture and provides a uniform but adequate pressure to the shank of a cutting tool in order to securely connect the cutting tool to a power driving unit.

It is a further object of the present invention to provide a chuck which may be utilized alternatively to secure one of a plurality of cutting units having different shank sizes and/or shape.

It is a further object of the present invention to provide a chuck wherein only one adjustable member is required to be manipulated in order to securely clamp the shank of a cutting element to the chuck assembly.

It is a further object of the present invention to reduce the manufacturing costs associated with producing chucks for securing a power driving unit to a cutting tool.

It is still a still further object of the invention to provide a threadedly adjustable means to secure a tool shank of a cutting tool in a "centered" position with respect to the axis of rotation of the power driving unit.

These and other objects advantages and features of the invention will be more fully understood when considered in conjunction with the following discussion and the attached drawings.

SUMMARY OF THE INVENTION

An improved chuck is provided which retains the shank of a cutting element securely therein. The chuck may be manufactured from a single piece of metal, such as a high carbon steel or a titanium metal containing-alloy which is provided with a throughbore, one end of which is threaded so as to mate with a power driving unit. The other end of the throughbore may be sized to receive a "standard" size shank of a cutting tool or alternatively is provided with at least one collet. The collet is provided with a longitudinal slot extending completely through the collet so as to make it resiliently insertable within the bore of the chuck. The collet has an external size and shape so as to be received within the throughbore in the chuck and an internal aperture to receive the shank of a cutting tool. A clamping means is provided, extending in a position displaced from the center of the aperture of the collet and overlying the longitudinal slot therein. In a particularly preferred embodiment, the clamping means comprises two sleeves which are machined so as to mate with the outer peripheral surface of the collet adjacent to the longitudinal slot. In the particularly preferred embodiment referred to above, the sleeves are retained in a bore extending transversely through the chuck in relation to the slot in the collet but displaced from the center of the collet. A threaded element may be used to draw the clamp members into contact with the collet, tending to close the longitudinal slot, resiliently compressing the collet so as to firmly grip the shank of a cutting tool placed in the bore of the collet while maintaining a precisely centered orientation.

Alternative embodiments of the improved chuck of the present invention are also disclosed.

DETAILED DESCRIPTION OF THE INVENTION

Figures 1, 2:
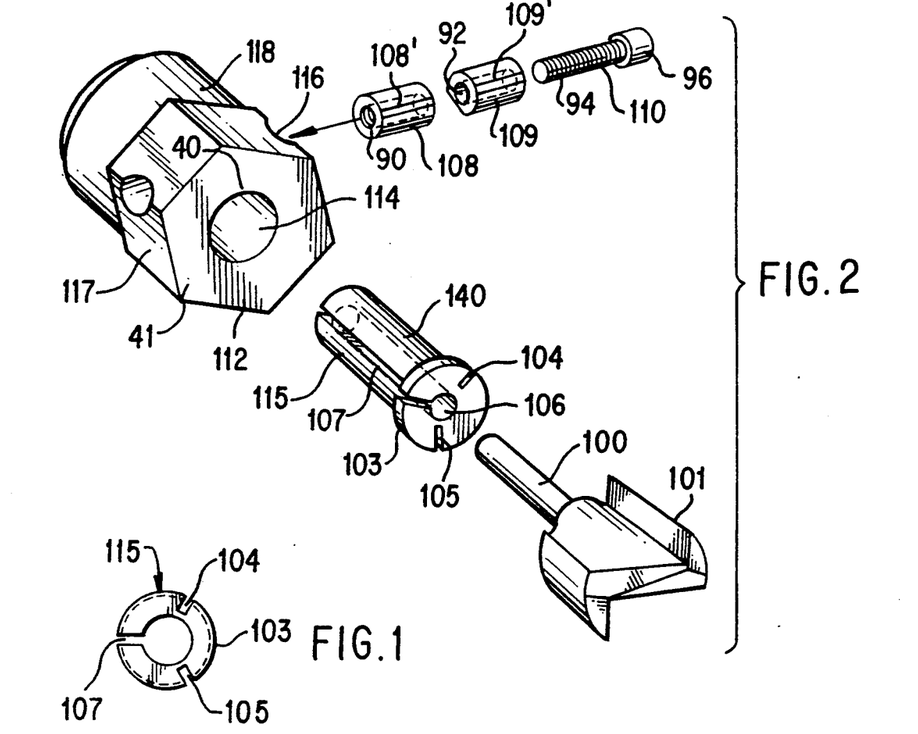
FIG. 1 is a plan view of the end of a collet element.
FIG. 2 is an exploded view of various components of one embodiment of the improved chuck of the present invention and a conventional router bit.
Figures 3, 4, 5:
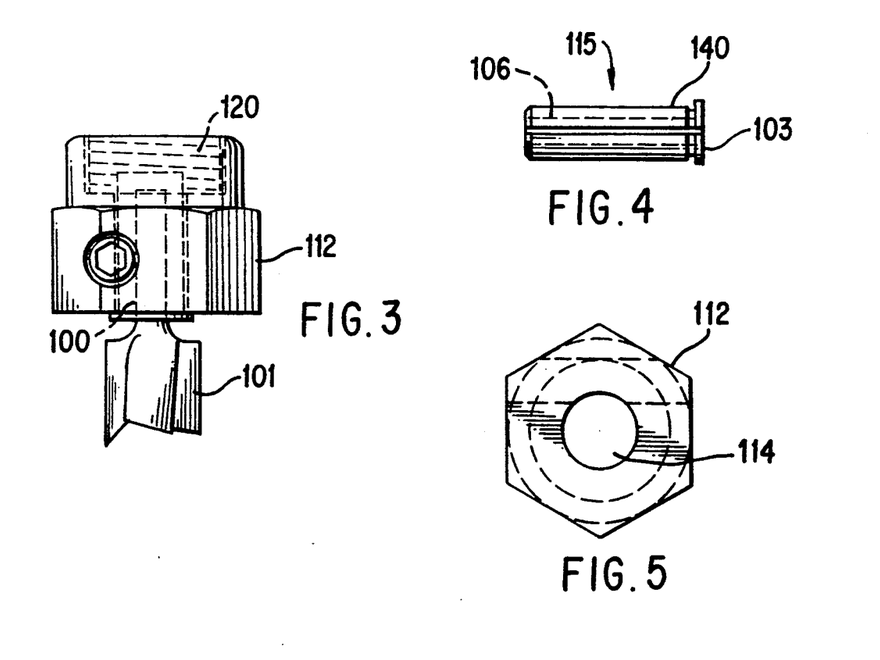
FIG. 3 is a side view of the assembled chuck of FIG. 2 and a conventional router bit.
FIG. 4 is a side plan view of the collet element of FIG. 1.
FIG. 5 is a bottom view of the chuck body of FIG. 2.
Figure 6:
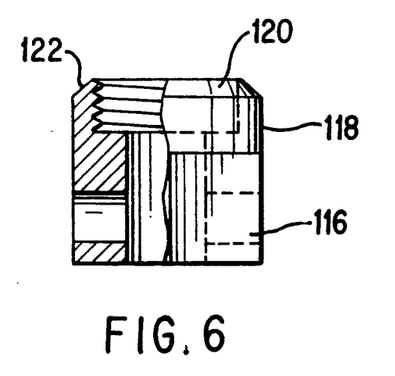
FIG. 6 is a side view of the chuck body of FIG. 2.
Figure 7:
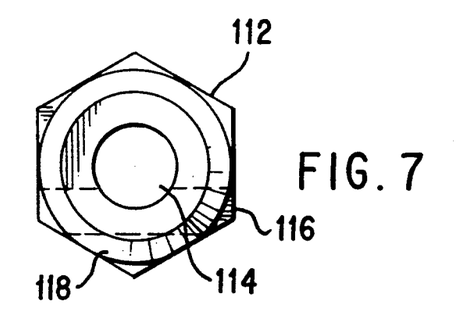
FIG. 7 is a top view of the chuck body of FIG. 2.

As illustrated in FIGS. 1 and 2, the improved chuck of the present invention includes a chuck body 112 which is provided with an aperture 114 into which a collet 115 can be inserted. The other end of aperture 114 may be shaped for attachment to a conventional power driving unit (not shown) such as by provision of the internal threads 120 (FIG. 6). In a particularly preferred embodiment, aperture 114 is a throughbore. Collet 115 preferably consists of a cylindrical element containing an aperture, preferably a longitudinal bore 106 extending continuously therethrough. One end of the collet 115 is provided with a flange 103. A longitudinal slot 107 extends completely through the flange and cylindrical section of collet 115 in a substantially longitudinal direction. An indicia 40, which may be a protuberance or depression, may be provided on the face 41 of chuck body 112 for aligning slot 107 with chuck body 112. In a particularly preferred embodiment, the flange 103 may contain additional notches 104, 105 permitting collet 115 to be flexibly compressed. It can be appreciated that the actual number of notches in the flange 103 can be varied but in a particularly preferred embodiment the collet 115 also includes notches 104, 105, each notch being equiangularly postured or 120° from an adjacent notch and from longitudinal slit 107. As shown in FIG. 4, the cylindrical portion 140 of collet 115 is integral with flange 103. Bore 106 is illustrated as being substantially circular in cross section but it is to be understood that it might be made of any shape and size so as to receive the shank 100 of conventional cutting element 101. The shank 100 of cutting element 101 is insertable through bore 106 and collet 115 as shown in FIG. 3.

The external configuration of chuck body 112 may be of any size or shape but in a particularly preferred embodiment it is provided with flats 117 so as to accommodate a wrench or other hand tool for tightening the threads 120 of chuck body 112 to the mating threads of a power driving unit (not shown). The entire external portion of chuck body 112 need not carry flat 117 but may be of other configurations, such as the cylindrical configuration shown at 118 in FIG. 2. Preferably, chuck body 112 is provided with a throughbore 116 across flat 117 so as to accommodate the clamp actuating mechanism of the present invention. The clamp actuating mechanism can comprise any threaded member such as a nut and bolt. However, in a particularly preferred embodiment, the clamp actuating mechanism comprises two clamping elements 108, 109, the respective ends 113, 113a thereof being machined so as to mate with the outer peripheral configuration 140 of collet 115 or the shank 100, of a tool 101' (FIG. 3A) placed therein. In a particularly preferred embodiment, at least the clamping element 108 distal to head 96 is internally threaded so as to receive the mating threads 94 of screw 110 permitting an adjustable compression of longitudinal slot 107 of collet 115 by rotation of head 96 of screw 110. Rotation of head 96 of screw 110 can be done with a conventional tool, such as a hex wrench 124, although it is to be understood that head 96 of screw 110 can take any conventional shape such as those receiving a blade or Phillips screwdriver or externally shaped so as to be received within a wrench or socket. By rotating screw 110 so as to engage threads 94 with the internally threaded bore 90 of clamping element 108, a longitudinal slot 107 in collet 115 can be adjustably compressed so as to securely retain shank 100 of a conventional cutting tool 101 therein.

Clamp elements 108, 109 may be provided with keys 108', 109', respectively, or keyways (not shown) to mate with corresponding keyways (not shown) or keys (not shown), respectively, to retain them in a desired orientation with regard to the collet 115 (FIG. 2) or shank 100' of cutting tool 101' (FIG. 3).

Bore 92 of the other clamping element 109 is preferably unthreaded, although it may be optionally threaded. As can be appreciated from FIG. 6, aperture 114 is illustrated as being of a size different in the collet receiving end of chuck body 112 as compared to the threaded power driving unit (not shown) receiving threads 120.

It is to be understood that such different aperture sizes are used for illustration only and that the collet receiving aperture in chuck body 112 may be smaller than, the same size as, or larger than the threaded power driving unit receiving portion of the aperture of chuck body 112. The collet receiving aperture 114 in chuck body 112 need not be of circular cross-sectional configuration as shown but needs to be of a shape and size to receive the outer peripheral surface 108 of collet 115.

Figure 3A:
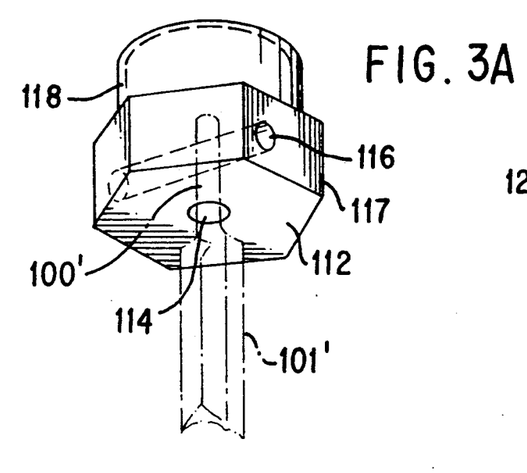
FIG. 3A is a side view of a partially assembled chuck and conventional router bit in the absence of the collet.

In a desired embodiment of the invention, the aperture 114 is sized and shaped to directly receive the "standard" shank 100' directly without a collet (FIG. 3A). A collet 115 is provided with its own "standard" bore 106 so as to receive further "standard" sized shank 100 (FIG. 3). In this manner the most widely used shank sizes may be interchangeably used with the chuck of the present invention. For example, if aperture 114 was sized and shaped to receive a ½ inch shank, bore 106 of collet 115 could be sized and shaped to receive a smaller shank, for example, a ¼ inch shank.

Additionally, it is to be understood that although only one collet is illustrated having a bore 106 therethrough, it is also within the scope of the present invention to provide a series of additional collets (not shown) which are similar to collet 115 except having respective bores (not shown) which are of size and/or shape different than bore 106 of collet 115. The purpose of such additional collets is to receive the shanks of cutting elements (not shown) which are different in shape and/or size than the illustrated shank 100 of cutting element 101.

Collet 115 is preferably formed from a metal which is sufficiently resilient so as to permit numerous flexings upon repeating closing and opening of longitudinal slot 107. A conventional metal such spring steel can be used to advantage although it is within the scope of the present invention to use other carbon steels. Preferably chuck body 112 is formed from a high carbon steel but it is of particular advantage to use a titanium metal or titanium-containing metal alloy so as to reduce the weight but retain the strength inherent in titanium metal.

Figure 8:
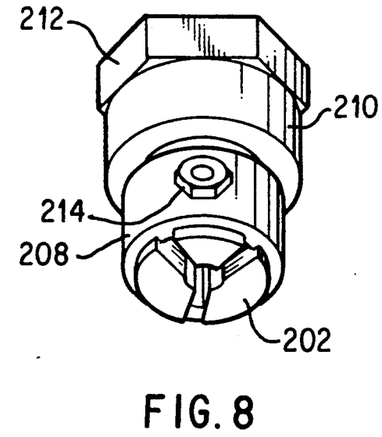
FIG. 8 is a perspective view of an alternative embodiment of the present invention.
Figure 9:
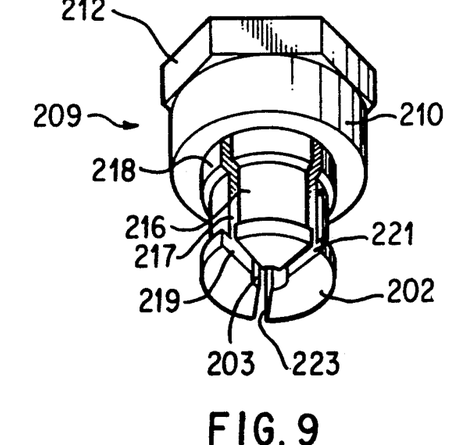
FIG. 9 is a perspective view of the chuck body and jaws of the alternative embodiment of FIG. 8, with the ring removed to show detail of the jaws.
Figure 10:
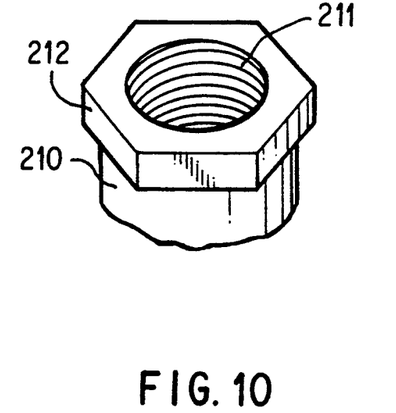
FIG. 10 is a perspective view of the chuck body of FIG. 9.
Figure 11:
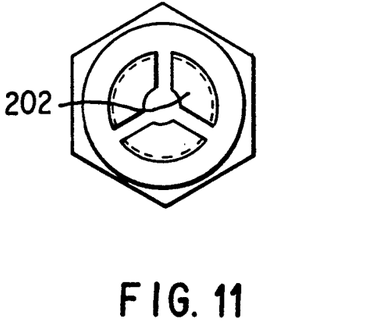
FIG. 11 is a bottom view of the embodiment of FIG. 8.
Figure 12:
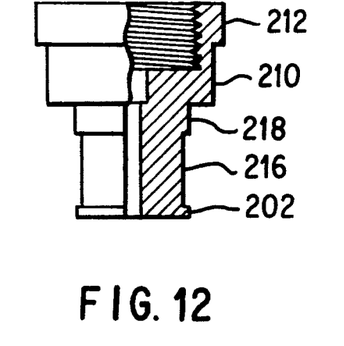
FIG. 12 is a side view of FIG. 9.
Figure 13:
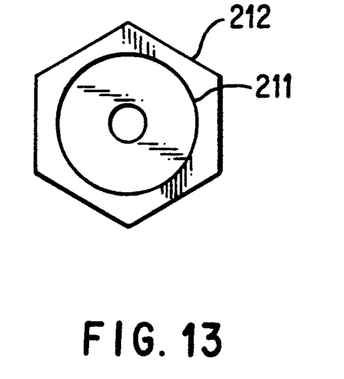
FIG. 13 is a top view of the chuck body of FIG. 10.
Figure 14:
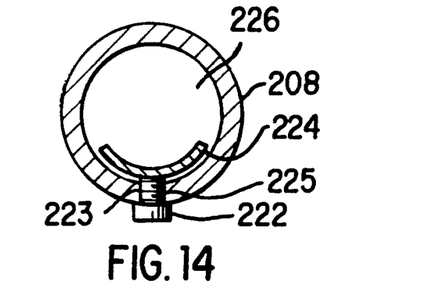
FIG. 14 is a top view of the ring, removed from the embodiment of FIG. 8.
Figure 15:
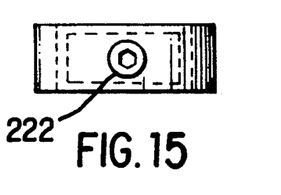
FIG. 15 is a side view of the ring of FIG. 14.
Figure 16:
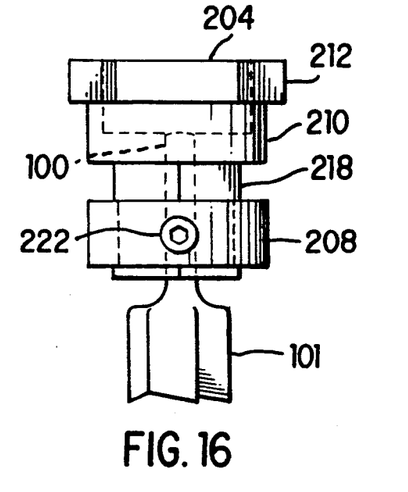
FIG. 16 is a side view of the assembled chuck of FIG. 8 together with a conventional router bit.
Figure 17:
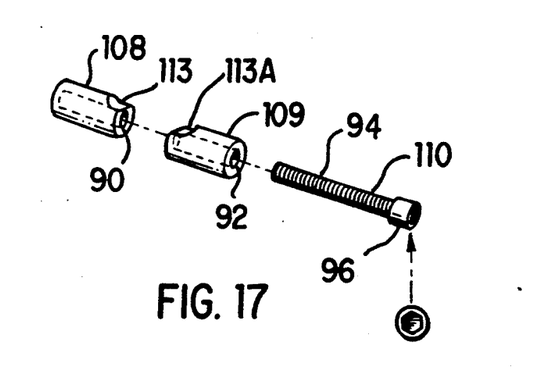
FIG. 17 is an exploded view of the actuator components of the embodiment of FIG. 2.
Figure 18:
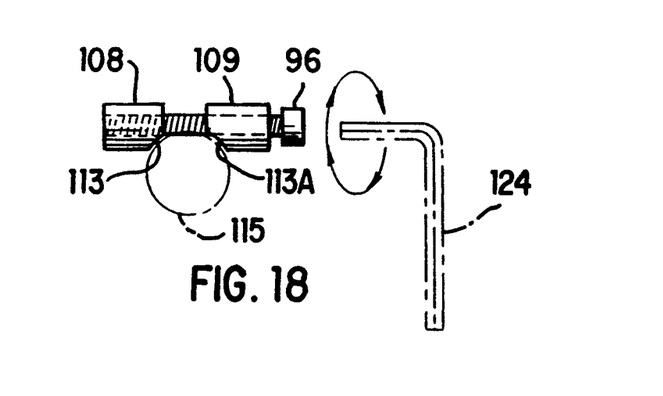
FIG. 18 is an assembled view of the actuator components of the present invention together with a conventional adjustment tool.

In an alternative embodiment, as illustrated in FIG. 8, there is provided an improved chuck according to the present invention. A chuck body 209 is provided with a flat 212 at one end which is provided with an aperture 203 which is internally threaded 211 so as to receive a mating threaded portion of a power driving unit (not shown). Flat 212 may be provided for purposes of engaging with a wrench for tightening threads 211 of the chuck body 209 to the threads of the power driving unit (not shown). The remainder of chuck body 209 is preferably reduced in size and weight, such as by machining a cylindrical outer cross-section 210 so as to reduce the weight of chuck body 209. The lower portion of chuck body 209 surrounding aperture 203 is integral with portions 210, 212 of chuck body 209. The tool receiving end of chuck body 209 is provided with a flange 202 and a shoulder 218 defining therebetween a substantially cylindrical portion 216. Portion 216 contains longitudinal slot 219 which slot 219 extends through flange 202. In a particularly preferred embodiment, three slots 219, 221 and 223, equiangularly arranged about aperture 203 are provided in cylindrical portion 216 and flange 202. The ring 208 is provided with a radially extending threaded bore 223 so as to receive a threaded element 225 which is engageable with ring section 224. Threaded element 225 is provided with any conventional head 222 for receiving a conventional tool (not shown) permitting rotation of threaded member 225. The inner peripheral cross-section 226 of ring 208 is smaller than the outer peripheral area of flange 202. By means of suitably heating ring 208 relative to flange 202, ring 208 may be slipped over flange 202 due to differential thermal expansion. Upon cooling of ring 208 to reduce its cross-section, ring 208 is captured on chuck body 209. Before ring 208 is placed over flange 202, ring element 224 is positioned in proximity to cylindrical portion 216 so as to be capable of receiving threaded element 225. Upon assembly with a conventional cutting element 101, rotation of head 222 of threaded element 225 will force ring element 224 radially inwardly while simultaneously urging ring 208 radially outwardly in a push-pull relationship thereby resiliently clamping cylindrical portion 216 to the shank 100 of conventional cutting element 101. Ring element 224 and ring 208 preferably are formed of titanium metal or a titanium metal containing alloy.

Figure 19:
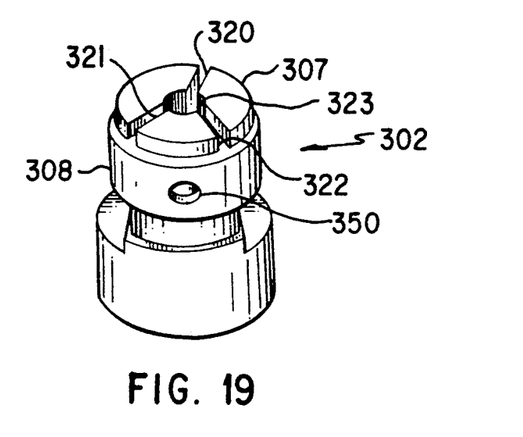
FIG. 19 is a perspective view of a further embodiment of the present invention.
Figure 20:
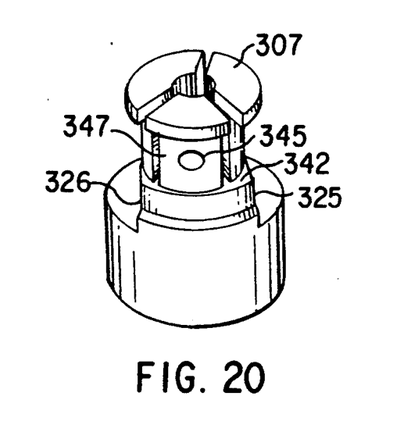
FIG. 20 is a partially disassembled view of the embodiment of FIG. 19 with the ring removed.
Figure 21:
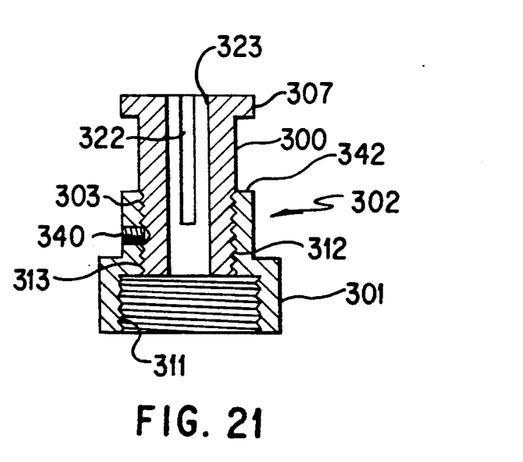
FIG. 21 is a side view of FIG. 20.
Figure 22:
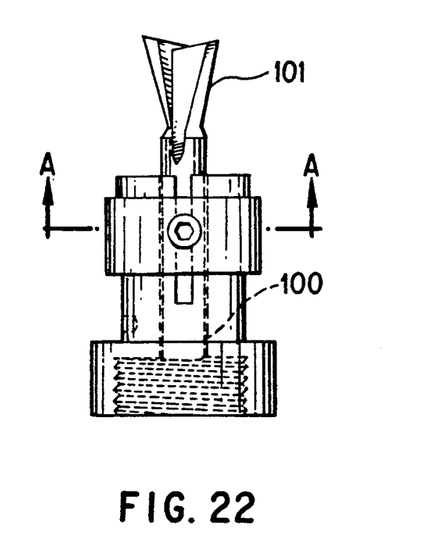
FIG. 22 is an assembled view of the embodiment of FIG. 19 together with a conventional cutting tool.
Figure 23:
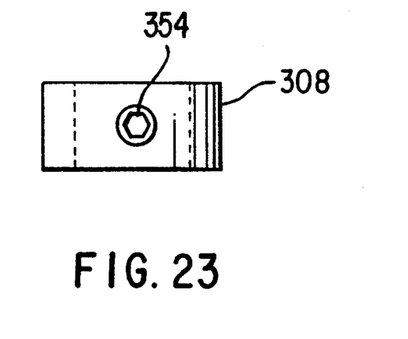
FIG. 23 is a side view of the ring removed from the embodiment shown in FIG. 19.
Figure 24:
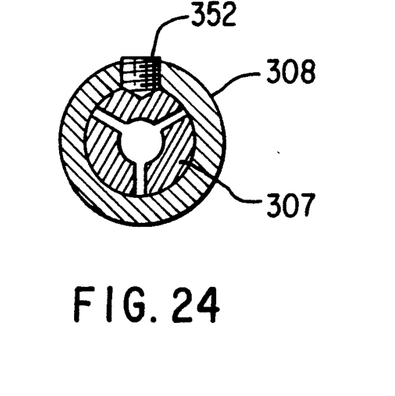
FIG. 24 is a sectional view taken along a—a of FIG. 22.
Figure 25:
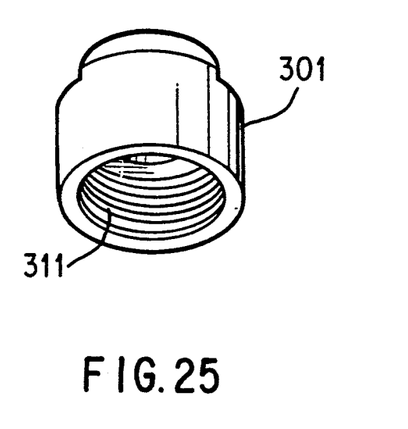
FIG. 25 is a perspective view of a lower chuck body element shown in FIG. 21.
Figure 26:
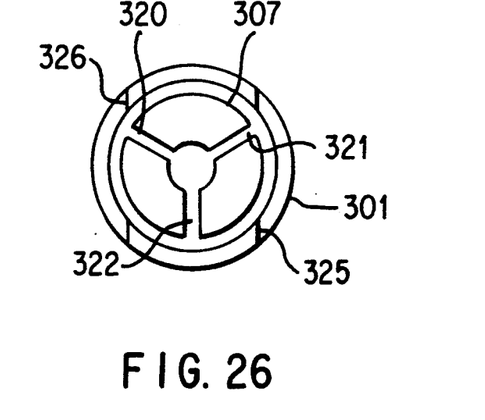
FIG. 26 is a top view of FIG. 21.
Figure 27:
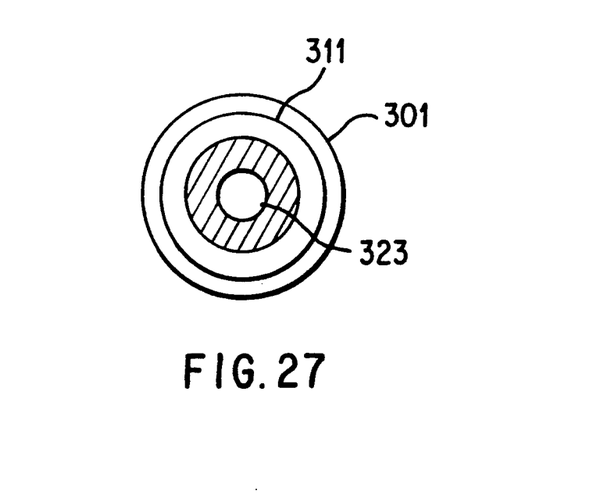
FIG. 27 is a bottom view of the upper chuck body element shown in FIG. 21.

In a still further alternative of the invention as illustrated in FIG. 19, a further improved chuck body 302 is provided. In order to facilitate the assembly of ring 308 upon chuck body 302, chuck body 302 is formed of two distinct pieces 300, 301 threadably engaged at 303. Portion 301 of chuck body 302 carries internal threads 311 so as to engage mating threads of a power driving unit (not shown) and is also provided with an additional internally threaded portion 312 so as to engage the externally threaded portion 313 of element 300 of chuck body 302. In this embodiment, a flange 307 is provided on element 300 which carries a plurality of longitudinal slots 320, 321, 322 preferably equiangularly positioned about bore 323. Flats 325, 326 are provided to receive a tool, such as a wrench, for rotatably securing chuck body 302 to the threads of the power driving unit (not shown). A set screw 340 may optionally be provided to assure that threads 312, 313 remain firmly engaged after assembly of elements 300, 301. As shown in FIG. 19, ring 308 is captured between flange 307 and shoulder 342 (FIG. 20). In order to obviate the need for heating of the ring to thermally enlarge the same in order to assemble it to the chuck body as in the embodiment of FIG. 8, the ring may be inserted between elements 300 and 301 before threads 312, 313 are engaged at 303. Set screw 340 may be tightened once elements 300, 301 are threadedly fastened. Ring 308 is provided with a threaded bore 350 into which threaded element 352 is rotatably received. Threaded element 352 may carry any conventional head 354 so as to receive a conventional tool (not shown) for rotating threaded element 352 in relation to threaded bore 350. By suitably rotating threaded element 352 in relation to threaded bore 350, slots 320, 321, 322 resiliently compress to firmly engaging shank 100 of conventional cutting tool 101 (FIG. 22). A depression 345 may be provided on at least one of the jaws 347 for receiving the end of rotatably threaded element 352 so as to prevent slippage of ring 308 relative to element 300.

Although the invention has been described in detail for the purpose of illustration it is to be understood that such detail is solely for that purpose and that those skilled in the art can make variations therein without departing from the spirit and scope of the invention except as it may be limited by the claims.

I claim:

1. A chuck comprising
    A chuck body including means for attaching the chuck body to a power driving means;
    said chuck body defining an aperture therein for receiving a collet;
    a collet shaped and sized to fit said aperture;
    a first and a second clamping element adapted to bear upon said collet from opposite sides thereof; and
    a mechanical means bridging said first and second clamping elements for drawing said first and second elements into clamping relationship with said collet.

2. The chuck of claim 1 wherein said aperture is shaped so as to mate with the shape of said collet.

3. The chuck of claim 2 wherein the collet has a substantially circular outer peripheral shape.

4. The chuck of claim 3 wherein the collet contains at least one longitudinally extending slot.

5. The chuck of claim 1 wherein the first and second clamping elements are of tubular shape.

6. The chuck of claim 5 wherein only one of said first and second clamping elements has a threaded internal bore.

7. The chuck of claim 6 further including a threaded element sized and shaped so as to engage the threaded internal bore of one of said first and second clamping elements.

8. The chuck of claim 1 wherein the means for drawing comprises a nut and bolt.

9. The chuck of claim 1 wherein the means for attaching the chuck to a power driving means is at least partially threaded.

10. A series of collets for use with the improved chuck of claim 1 comprising a series of bodies each carrying a flange on an end thereof; each of said bodies having an external peripheral size and shape so as to fit within the aperture within said chuck body and each of said bodies having an internal aperture size and shaped so as to receive a series of shanks of cutting tools, each of said internal apertures in said series of bodies being different in either size or shape.

11. The chuck of claim 1, further including an indicia on the chuck body defining an aperture for aligning the position of the collet.

12. The chuck of claim 1, wherein the means for attaching comprise an internally threaded aperture.

13. A chuck comprising
    a chuck body including means for attaching the chuck to a power driving means; said chuck body defining an aperture therethrough;
    said chuck body defining at least one slot therethrough in the longitudinal direction of said chuck body;
    a ring for surrounding said chuck body in a position overlying said at least one slot; and
    a radially extending threaded means for moving said ring in relation to said chuck body.

14. The chuck of claim 13 wherein said ring shaped member defines a radially extending throughbore.

15. The chuck of claim 14 wherein said throughbore is threaded.

16. The chuck of claim 14 further comprising an arcuate shaped member positioned between said ring and said chuck body, said arcuate shaped member being movable between said chuck body and ring due to rotation of a threaded means.

17. The chuck of claim 16 wherein said threaded means for moving said arcuate shaped member is threaded so as to mate with the threaded throughbore of said ring.

18. The chuck of claim 13 wherein the threaded means consists of only a single threaded element.

19. The chuck of claim 13 wherein said chuck body contains a plurality of slots extending in the longitudinal direction, each of said slots being equiangularly spread about the periphery of said chuck body.

20. The chuck of claim 11 wherein said element contains three slots.

21. The chuck of claim 16 wherein the radius of said arcuate shaped member and the radius of said ring are unequal.

22. The chuck of claim 21 wherein the radius of said arcuate element is larger than the radius of said ring.

23. The chuck of claim 13 wherein said chuck body is comprised of a single element.

24. The chuck of claim 13 wherein said chuck body is comprised of at least two elements, one element containing said means for attaching the chuck to a power driving means and at least one other element defining at least one slot therethrough for receiving the shank of a cutting tool.

25. A chuck comprising a chuck body; said chuck body including means for attaching the chuck body to a power driving means;

said chuck body defining a first aperture located opposite said means for attaching the chuck body to the power driving means;

said aperture being shaped and sized to receive a tool therein;

said chuck body also defining a second aperture intersecting said first aperture;

said second aperture being shaped and sized to receive a first and a second clamping element; and a mechanical means bridging said first and said second clamping elements for drawing at least one of said first and second clamping elements towards the other clamping element whereby at least one clamping element is caused to protrude into said first aperture and into clamping relationship with said tool.

26. The chuck of claim 25, wherein both said first and second clamping elements protrude into said first aperture.

27. The chuck of claim 25, further including keys to retain said first and second clamping elements in a desired orientation with regard to said first aperture.

28. The chuck of claim 25, wherein the means for attaching comprise an internally threaded aperture.

* * * * *